US006148342A

United States Patent [19]
Ho

[11] Patent Number: 6,148,342
[45] Date of Patent: Nov. 14, 2000

[54] SECURE DATABASE MANAGEMENT SYSTEM FOR CONFIDENTIAL RECORDS USING SEPARATELY ENCRYPTED IDENTIFIER AND ACCESS REQUEST

[76] Inventor: Andrew P. Ho, 627 N. Maple Dr., Beverly Hills, Calif. 90210

[21] Appl. No.: 09/229,694

[22] Filed: Jan. 13, 1999

Related U.S. Application Data
[60] Provisional application No. 60/072,740, Jan. 27, 1998.

[51] Int. Cl.[7] ................................................. G06F 13/00
[52] U.S. Cl. ......................... 709/225; 709/223; 713/201
[58] Field of Search .................................... 709/201, 202, 709/203, 217, 219, 223, 224, 225, 328; 713/200, 201, 202; 380/4, 28, 30

[56] References Cited

U.S. PATENT DOCUMENTS

| | | | |
|---|---|---|---|
| 5,202,921 | 4/1993 | Herzberg et al. | 713/162 |
| 5,245,656 | 9/1993 | Loeb et al. | 713/154 |
| 5,319,705 | 6/1994 | Halter et al. | 380/4 |
| 5,420,926 | 5/1995 | Low et al. | 705/74 |
| 5,539,824 | 7/1996 | Bjoorklund et al. | 709/249 |
| 5,606,610 | 2/1997 | Johansson | 713/193 |
| 5,640,454 | 6/1997 | Lipner et al. | 380/21 |
| 5,673,316 | 9/1997 | Auerbach | 380/4 |
| 5,754,939 | 5/1998 | Herz et al. | 455/4.2 |
| 5,768,391 | 6/1998 | Ichikawa | 713/153 |
| 5,864,683 | 1/1999 | Boebert et al. | 709/249 |
| 5,920,630 | 7/1999 | Wertheimer et al. | 380/25 |

OTHER PUBLICATIONS

Halamka, M.D., et al., A WWW Implementation of National Recommendations for Protecting Electronic Health Information, JAMIA, 1997; 4:458–464.

Biskup, et al., Crytographic Protection of Health Information: Cost and Benefit, International Journal of Bio–Medical Computing 43 (1966) 61–67.

Kilsdonk, et al., The Nucleus Integrated Electronic Patient Dossier Breakthrough & Concepts of an Open Solution, Int'l. Journal of Bio–Medical Computing 42 (1996) 79–89.

R.L. Rivest, Chaffing & Winnowing: Confidentiality Without Encryption, MIT Lab for Computer Science Mar. 18, 1998, (rev. Apr. 24, 1998).

J.J. Cimino, M.D., Beyond the Superhighway: Exploiting the Internet with Medical Informatics, 1996 AMIA Annual Fall Symposium, Oct. 26–30, 1996.

K. Pommerening, Pseudonyms for Cancer Registries, Meth. Inform. Med. 1996; 35: 112–21.

C.Quantin, et al., Irreversible Encryption Method by Generation of Polynomials, Med. Inform. (1996), vol. 21, No. 2, 113–121.

The Seismed Consortium, Data Security for Health Care, vol. II: Technical Guidelines, Studies in Health Technology and Informatics, 1996.

Swamy, Database Security: An Introduction, Mar. 1996.

*Primary Examiner*—Viet D. Vu
*Attorney, Agent, or Firm*—Blakely, Sokoloff, Taylor & Zafman

[57] ABSTRACT

A system for managing sensitive data is described. The system prevents a system administrator from accessing sensitive data by storing data and identifier information on different computer systems. Each query is encrypted using two codes, the first code readable only by an identifier database and a second code readable only by a data access database. By routing the data path from a source terminal to the identifier database which substitutes an internal ID, then to the data access database and back to the source terminal, data security is significantly improved.

15 Claims, 5 Drawing Sheets

Figure 2A. Flow Diagram 200

Figure 2B. Flow Diagram 200, continued

Figure 3A. This is the configuration of the most basic unit, without a log monitor.

Figure 3B. This is the configuration of the most basic unit, with a log monitor.

Figure 4. System 400

Figure 5. System 500

SECURE DATABASE MANAGEMENT SYSTEM FOR CONFIDENTIAL RECORDS USING SEPARATELY ENCRYPTED IDENTIFIER AND ACCESS REQUEST

This application claims benefit of Provisional Application Ser. No. 60/072,740, filed Jan. 27, 1998.

BACKGROUND OF THE INVENTION

1. Field of the Invention

This invention relates to protecting confidential information. In particular, the invention prevents insiders with high levels of computer access from accessing sensitive data.

2. Description of Related Art

Computer systems have long been used for processing sensitive information. Such systems typically include a database and a processor which manipulates large amounts of highly personal and confidential data. In order to protect outsiders from accessing the confidential data, fire walls and encryption systems are often used to prevent unauthorized access to the data. Examples of traditional systems and methods used to prevent unauthorized access to sensitive data include such mechanisms as user authentication, access location restriction, and user level access controls. Although such systems are useful for preventing "outsiders" from accessing confidential data, these systems are typically unable to protect the data from "insiders" who have been granted high enough system access privileges to bypass the security controls. In particular, it is very difficult to deny a system administrator access to sensitive or confidential data.

System administrators who have a high level of access can typically access most data on the computer system. As data on the computer becomes increasingly sensitive and valuable, the system administrator or other "trusted insider" increasingly has incentives to defeat the protection mechanisms of the system and sell the confidential data. Thus, a system which is capable of storing confidential data in a form that is inaccessible to high-level computer administrators while still granting access to sensitive data to appropriate parties is needed.

SUMMARY OF THE INVENTION

A method for retrieving sensitive stored data is described. A receiving terminal receives a request for data from a user and encrypts an identifier with a first code and a data access request with a second code. The identifier and data access request are transmitted to a first database which decodes the identifier and determines whether the user has authorization to request the desired information. The first database then retrieves an associated access level and internal identifier. The first database forwards the still encrypted data access request with the associated access level and internal identifier to a second database.

The second database retrieves the information requested in the data access request and in one embodiment, if the user has an appropriate access level, transmits the requested information to the receiving terminal.

DETAILED DESCRIPTION OF THE INVENTION

In the following detailed description, a method and apparatus for protecting sensitive data will be described. The detailed description will set forth numerous specific details to provide a thorough understanding of the invention. However, those skilled in the art will appreciate that the invention may be practiced without the specific details. In other instances, well-known methods, procedures, protocols, components and circuits, for example, public and private key cryptography which is well-understood by those of ordinary skill in the art have not been described in detail so as not to obscure the invention.

In one embodiment of the invention, the secure system is implemented using a large network of subnetworked computers. For example, the Internet represents a large network which couples together subnetworks such as a local area network or ethernet coupled computers. For optimal security, each of the subnetworks described will be under the control of a different administrator. Each administrator will not have control over computers outside of the respective subnetwork. By partitioning sensitive data and distributing storage and retrieval of sensitive data over different subnetworks of computers, the data will be protected from improper access by an individual administrator of a subnetwork.

Figure 1:
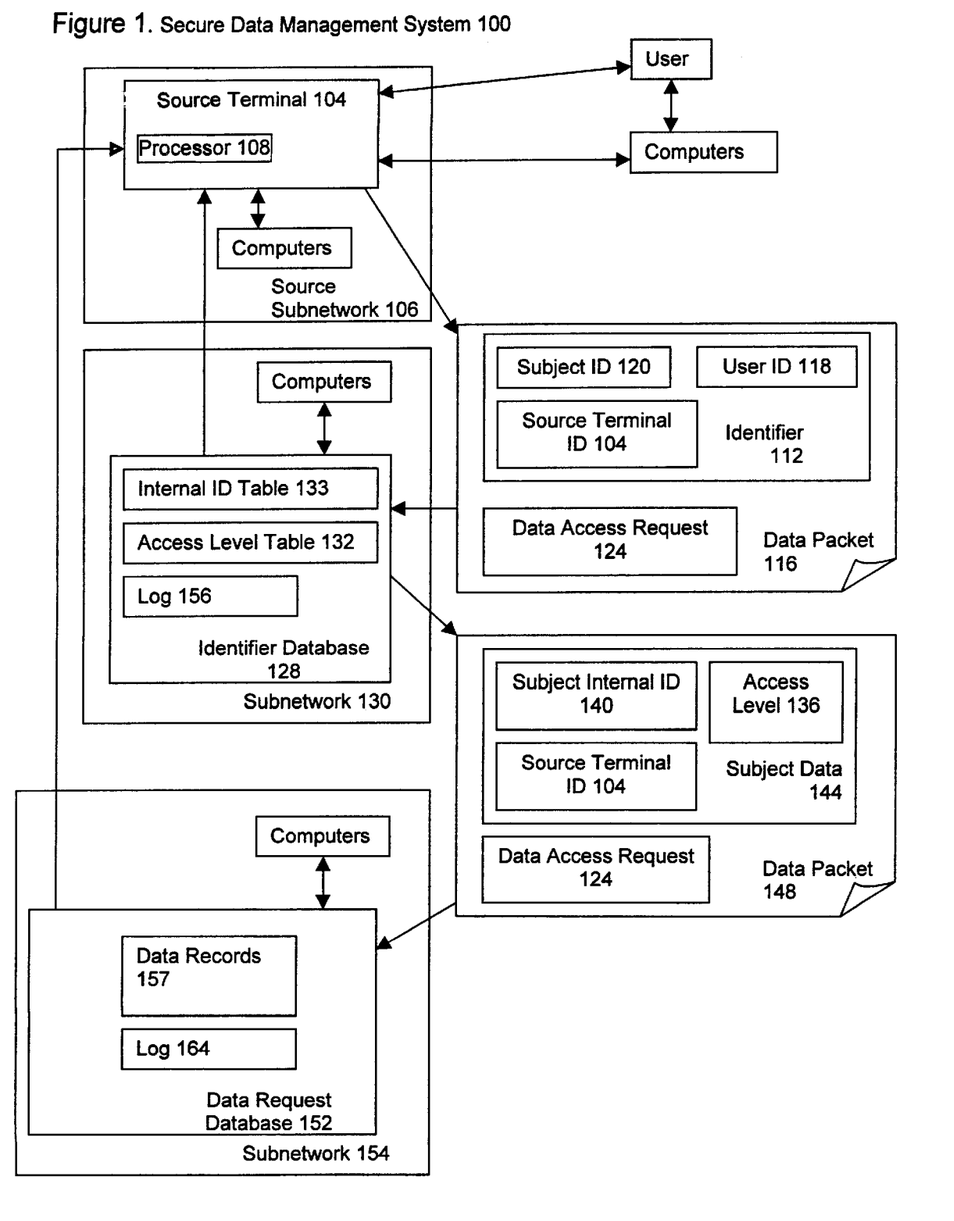
FIG. 1 illustrates a computer network for implementing one embodiment of a data management system.

FIG. 1 illustrates a secure data management system 100 used to implement one embodiment of the invention. A user inputs data into a source terminal 104. A typical user may be a doctor or other personnel with an appropriate level of access to request the needed data. In one embodiment, source terminal 104 may be a computer, or other processing device, including a personal computer. In an alternate embodiment, source terminal 104 is merely a terminal coupled to a main frame computer or other processing device. The source terminal may be associated with a local computer network or "source subnetwork" 106. Source subnetwork 106 may be a plurality of computers connected by a local area network. Source terminal 104 identifies or collects information to identify the user, typically by obtaining passwords, handprints, fingerprints, retinal scans, or other appropriate identification mechanism. After verification of the user's identity, the user, for example, a doctor, a lawyer, drug enforcement personnel, government official or banker, who has a need to know the information, requests access to specific information about a particular individual subject which is processed by the secure data management system 100. The user can also be a computer program or system.

Source terminal 104 receives information from the user and combines the information into a data packet 116 for output to other sections of secure system 100. The data packet 116 is composed of two smaller data packets, an identifier 112 and a data access request 124. Identifier 112 includes subdata packets such as user I.D. 118 and subject I.D. 120. The first subdata packet, user I.D. 118, includes information on the user such as information needed to identify the doctor requesting data. Such information may include, but is not limited to the last name, first name, middle name, social security number, birth date, mother's maiden name, driver's license, medical license number, state bar number, drug enforcement agency number, invoice number, fingerprint number, or other information necessary or useful for identifying the user requesting the data. Second subdata packet, subject I.D. 120, includes information about the subject. The information in the second subdata package includes data needed to identify the individual or entity relating to the data access request. Such information may, for example, include the last name, first name, middle name, social security number, birth date, birthplace, mother's maiden name, driver's license, street address, e-mail, file number, patient identification number, inmate identification number, account number, or name of company.

A processor 108 associated with source terminal 104 encrypts the identifier 112, including subdata packets 118, 120 using a first encryption code. In one embodiment of the invention, identifier 112 also includes subdata packet 104 which contains information or an address of the source terminal 104 which generates the subdata pack 116. The address of the source terminal may be included in subdata packet 104 as a globally unique identifier or "GUID."

Data packet 116 also includes a second portion, the data access request 124. Data access request 124 contains the specifics on the data requested, such as a request for a lab result or a request to append a new progress note. Data access request 124 may also in one embodiment of the invention be a token. A token may be an instruction, index or code which specifies a memory address or other instruction to be performed by the token recipient. The token authorizes communications to source subnetwork 106 to obtain the details of the data request. Processor 108 encrypts the data access request 124 in a second code. The data access request 124 is associated with the identifier 112 within data packet 116 such that external subnetworks of computers or processors can link the identifier 112 to the data access request 124.

In medical applications, source terminal 104 is typically a computer in a source subnetwork 106 of computers serving a facility such as a medical facility or hospital. The source terminal 104 transmits the data packet 116, including the identifier 112 and the data access request 124 to a second processor or identifier database 128. The identifier database is preferably part of a second subnetwork 130 of computers. The second subnetwork 130 is typically a local area network under control of a second administrator. The second subnetwork 130 and the source subnetwork 106 may be located in different regions of the country. A communications link couples source terminal 104 and identifier database 128. In one embodiment, the communications link is an Internet link and/or private line.

Identifier database 128 has the codes necessary to decrypt identifier 112. Encoding and decoding of identifier 112 may be done by a variety of methods. In one embodiment of the invention, source terminal 104 encrypts identifier 112 using a public key of identifier database 128. Identifier database 128 decrypts the identifier 112 in data packet 116 using a corresponding private key. Because identifier database 128 does not have the decryption key needed to read information contained in data access request 124, the data access request information remains protected from the system administrator of identifier database 128 and subnetwork 130.

Identifier database 128 uses the information contained in identifier 112 to generate (1) an access level indicating the access allowances of the user requesting data, and (2) an internal identifier identifying the individual or entity (the subject) corresponding to the requested data. Identifier 112 information serves as a search key to query a database, typically a table 132. In one embodiment, the user requesting data, specified by user I.D. 118, is used to identify data for lookup in table 132 and determine the user's approved access level in relation to the individual identified in subject I.D. section 120. In particular, the subnetwork 130 determines the types of data access activities that the user is permitted to perform on the records relating to the subject identified by subject I.D. 120. For example, the subnetwork 130 may determine whether the user is a doctor currently treating the identified individual. When a doctor is identified as treating an identified individual, the doctor is associated with a corresponding access level to permit the doctor to review x-ray, lab results, or add a progress note to the patient's records. The subnetwork 130 containing identifier database 128 associates an authorized user access level to the doctor. Identifier database 128 assigns a Subject Internal I.D., typically using a table such as table 133, to the individual identified in Subject I.D. Section 120 of identifier 112.

The identifier database 128 outputs a data packet 148 including (1) a subject data section 144, and (2) a data access request 124. In one embodiment, the subject data section 144 includes a user access level subsection 136 and an internal identifier stored in a subject internal identifier subsection 140. Subject data section 144 may also include the address of the originating source terminal 104. Because the material contained in subject data section 144 is typically incomprehensible to an interloper, it is not required that the subject data section 144 be encrypted. In maximum security systems, subject material in subject data 144 is encrypted with a code such that the subject material is only readable by data request database 152. In one embodiment of the invention, the identity of the user and the subject, the address of source terminal 104 and the time at which data was received and/or transmitted is stored in a log 156 in identifier database 128.

Data request database 152 and the associated subnetwork 154 receives data packet 148. When subject data 144 is encrypted, data request database 152 decrypts the subject data section 144 of data packet 148 and retrieves the subject internal I.D. 140 and the user access level 136. Data request database 152 also decrypts the data access request 124. Data access request 124 of data packet 148 is encrypted using a code readable only by data request database 152. In one embodiment of the invention, source terminal 104 encrypts data access request 124 with the public key of data request database 152 allowing data request database 152 to retrieve the data access request 124 using a corresponding private key.

Data request database 152 determines if the user access level is sufficient to perform the type of data access requested in data access request 124 upon the records corresponding to the subject internal identifier 140. When the user has an appropriate user access level and is thus entitled to perform the operation, the data request database 152 performs the requested operation upon records keyed to the internal identifier 140.

In one embodiment, the data request database 152 does not contain the demographics, personal identifiers, and other personally identifiable information which can be used to link individuals or entities to the data contained in data records 157. The known individually identifiable attributes including, for example, demographics and specific identifiers such as addresses are removed and stored in the identifier database 128. Thus, although the system administrator for data request database 152 and corresponding subnetwork 154 can access information corresponding to the requested data, for example, that a record indicates a diagnosis of AIDS, the administrator cannot determine the name of the patient who has this diagnosis. Only identifier database 128 contains information linking the public identity such as name and address of the patient to the internal identifier. It is conceivable that the splitting of data between the identifier database 128 and the data request database 152 can be used to store other sensitive data where it is desirable to prevent linkage between two data elements except by authorized users.

After data request database 152 performs the requested data access operations, such as retrieving a set of lab results from table 157, the database 152 uses source terminal I.D. 104 included in the subject data 144 to send a result set of the data operations back to source terminal 104. The connection between the data request database 152 and source terminal 104 may be via Internet or the data may be transmitted over a secured line. The result set can be encrypted for the transmission to the source terminal, for example, using the public key of source terminal 104.

In order to further improve security, in particular to prevent a single system administrator of either identifier database 128 or data request database 152 from sending queries to the system to try to determine internal identification codes or to perform unauthorized data access, each database maintains a log. The identifier database maintains a first log 156 which may store that a query was received from a certain user at source terminal 104 and that a query occurred at a specific time. Likewise, data request database 152 maintains a second log 164 which records the subject internal I.D. operated upon, the destination to which the requested information was sent, and the source terminal I.D. 104 as well as the time at which information was transmitted or received from identifier database 128. When there is a question as to the integrity of the systems, a third party auditor can compare the first log 156 and the second log 164 to determine whether there are irregularities. The preferred procedure for a third party audit utilizes a procedure such as check sum or hash function to transform these logs prior to making them available to the auditor thereby protecting the confidential identity of the user-subject pairs.

Periodic reports can be generated by the identifier database disclosing the identity of all users who accessed a given subject's records over a specified time interval. These reports can be sent directly to the subject or a person designated by the subject for review. Any irregularities can then be corrected as appropriate. Inappropriate access of records can thereby be identified in a timely manner and all users held accountable for their activities.

Figure 2A:
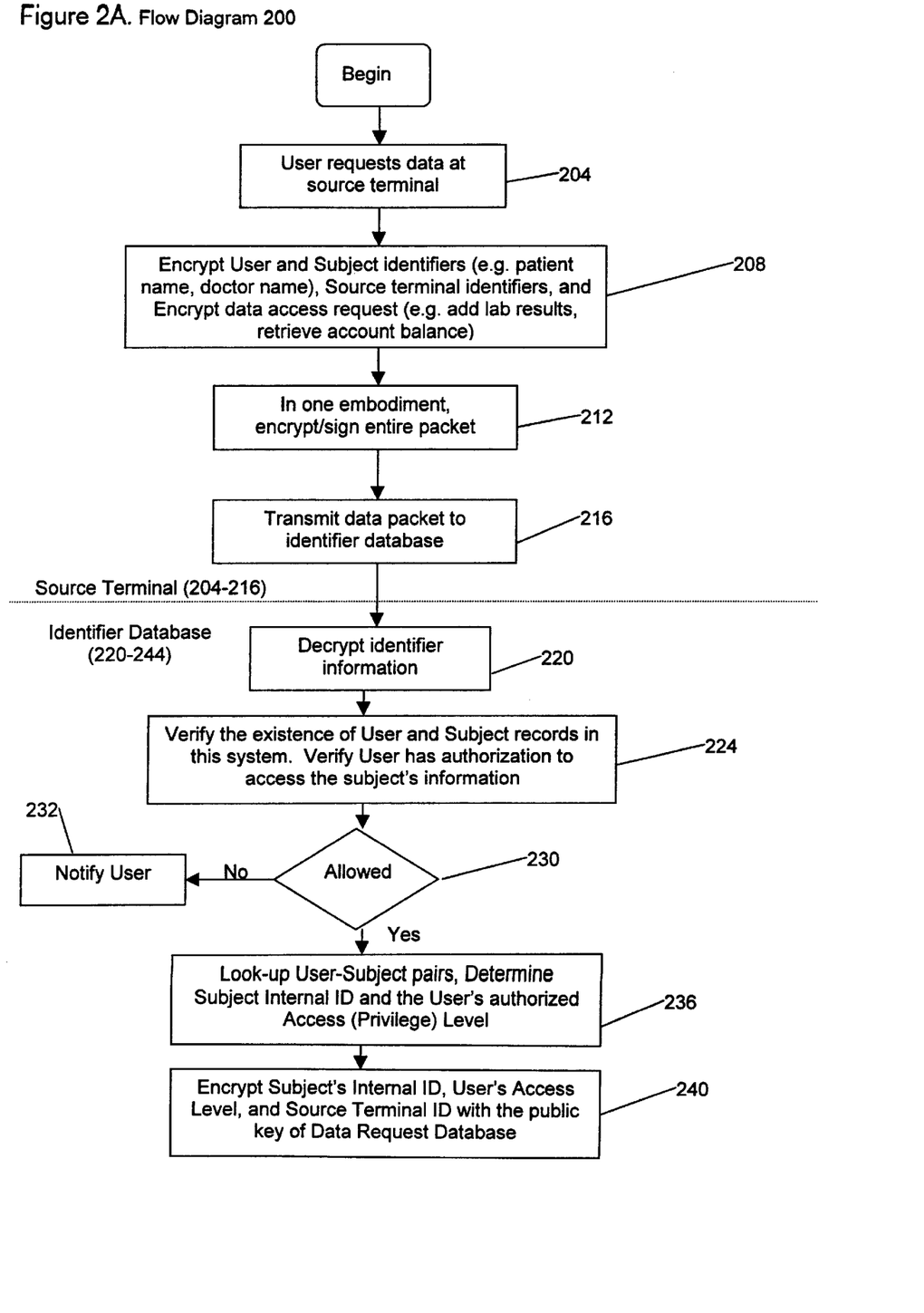
FIGS. 2A & 2B are flow diagrams illustrating a method of implementing the data management system.
Figure 2B:
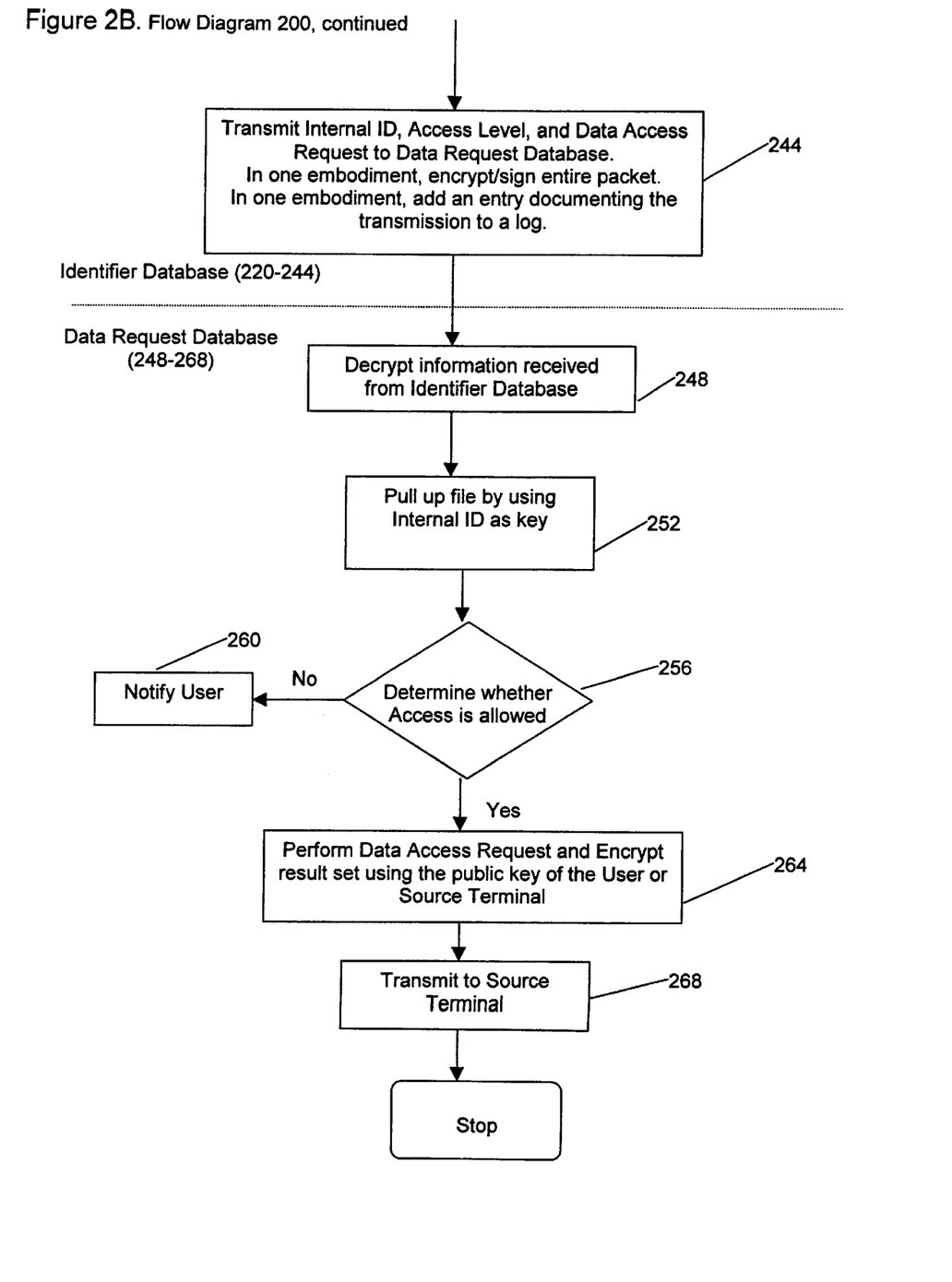

FIGS. 2A and 2B is a flow diagram 200 illustrating the procedures used to implement the current, described invention. In block 204, a user at a source terminal requests data. The user may enter information such as a password, or other identifying information to indicate that the user is the entity he or she claims to be. The source terminal encrypts the subject's identifying information such as the patient name with a first code in block 208. In one embodiment, the identifier is encrypted using a public key of an identifier database. The identifier typically includes the address of the terminal, and user information such as the name of the person requesting the information. The identifier package may also include the public key of the source terminal.

In block 208, the source terminal also encrypts the data access request using a second code. In one embodiment, the data access request is encrypted using a second public key of a second database, such as a data request database. The data access request contains information regarding the nature of the data request, such as delete a record, display laboratory result, and update financial information.

In one embodiment of the invention, the entire data packet is signed in block 212. Such encryption may be done with a private key of the source terminal. Such encryption serves to identify the source terminal 104 and prevent other terminals from mimicking source terminal 104. In alternative embodiments, authentication may be done by digitally signing the data packet using one of many well-know digital signing algorithms such as RSA, ElGamal, and Rabin. In block 216, the data packet is transmitted to a subnetwork including a computer containing a first database or identifier database.

Within the identifier database, the identifier information is decrypted in block 220. Typically, decryption is done using the private key of the identifier database. In block 224, identifier database uses the decrypted identifier information to look-up the individual for whom data is requested (subject), such as a patient in a hospital, and makes sure that such person or entity exists. The identifier database also verifies that the individual requesting the access has the authority to access the subject's information in block 224. For example, the subject may be a patient in a hospital and the person requesting the data may be a doctor. When used in a hospital, the identifier database may check a table to make sure that the patient and the doctor represent a doctor-patient pair in block 224. If the doctor and patient do not form a doctor-patient pair, access is not allowed in block 230 and the source terminal is notified that the information is not available in block 232. If the doctor and patient are a doctor-patient pair, then access is allowed in decision block 230 and the database retrieves the (1) appropriate privilege level corresponding to the doctor-patient pair and (2) the internal ID corresponding to the patient in block 236.

The identifier database encrypts the internal ID, the privilege level, and the source terminal address in block 240 for transmission to a data request database in a separately administered subnetwork. The actual patient name as well as the doctor name is stripped from the data, identified only by an internal ID. In one embodiment of the invention, identifier database encrypts the internal ID with the public key of the data request database. In block 244 of FIG. 2B, the data packet including the internal identifier, user access level or privilege level, along with the original encrypted data access request, is transmitted to the data request database in block 244. In one embodiment, an entry is added to a log to document the transmission in block 244. The transmission may be through a dedicated line or virtual private network to ensure data security and integrity. In one embodiment, the entire packet is encrypted and signed.

In block 248, the data request database decrypts the information received from the identifier database. In block 252, the data request database retrieves the patient's medical records file corresponding to the internal identifier. In decision block 256, the data request database determines if access to the particular information in the file is allowed based on the access privilege level received. If access is not allowed, a notice is sent to the source terminal in block 260.

When the privilege level authorizes access to the specific information, the data request database performs the requested operation and encrypts the result set in a data packet for transmission to the source terminal. In one embodiment, the requested information is encrypted with the public key of the source terminal in block 264. The public key of the source terminal could have been received with the data access request. The encrypted data is then transmitted back to the source terminal in block 268. The source terminal decodes the data and displays it to the authorized user.

By dividing the data in a transaction request packet into several parts, each part accessible to only one computer system or corresponding subnetwork run by corresponding independent system administrators, subject confidentiality and data integrity of the information is preserved. Each database, such as identifier 128 and data request database 152 can be implemented on standard computer systems. These systems may be integrated using a network of direct connections or if data transmissions are encrypted, using publicly available Internet connections.

Figure 3A:
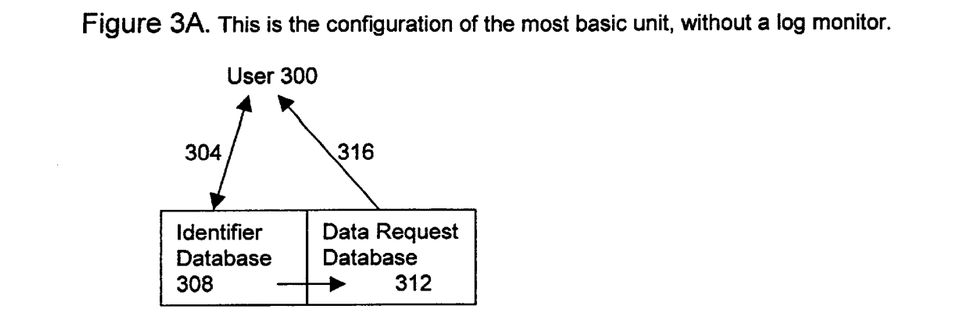
FIGS. 3A, 3B, 3C and 3D illustrate different embodiments of a data management system utilizing the disclosed invention.
Figure 3B:
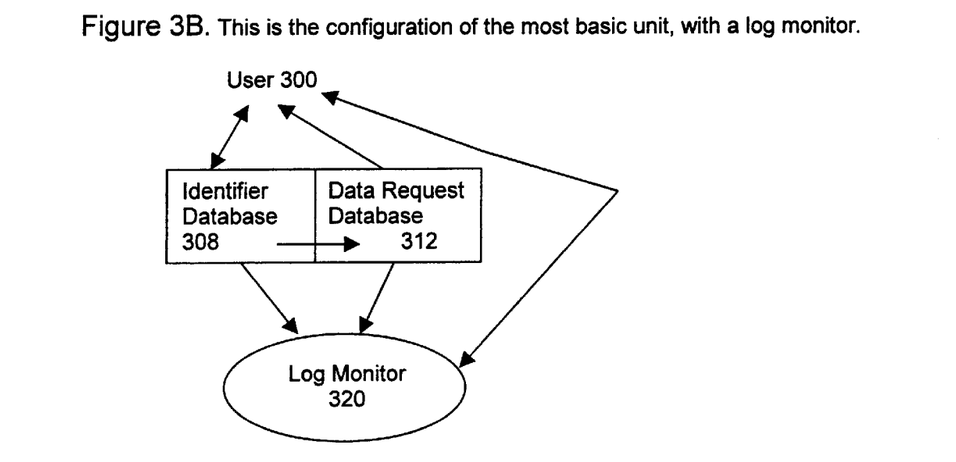
Figure 3C:
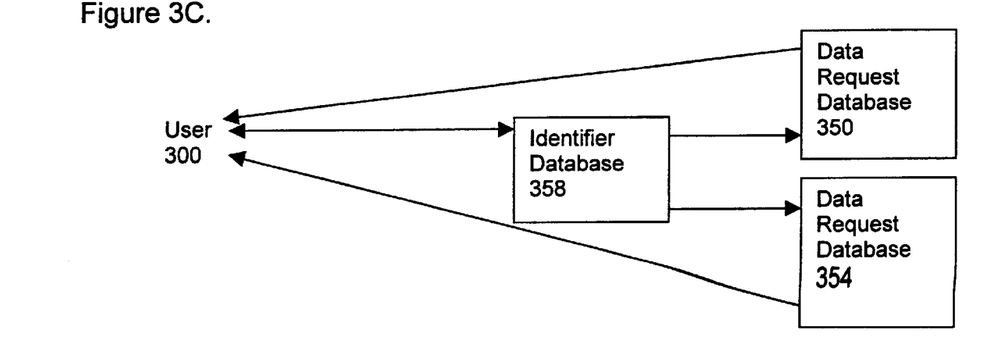
Figure 3D:
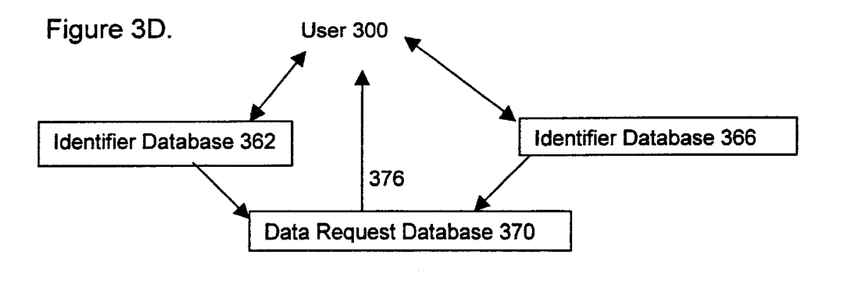

The previous descriptions also show the data flow flowing from a source terminal 104 to an identifier database 128 through the data request database 152 back to the source terminal. FIGS. 3A and 3B illustrate this basic structure without and with the log monitor, respectively. However, the invention should not be limited to such a data flow as other data flows are possible. FIGS. 3C and 3D illustrate alternative embodiments of information flow and data management system design.

FIG. 3A illustrates a bidirectional data flow between a user 300 and an identifier database 308 along data path 304. When identifier database 308 accepts a query, the identifier database 308 forwards the data request to a data request database 312. Data request database 312 provides a response along data path 316 to user 300. The illustrated configuration of FIG. 3A is a basic unit which does not include a log monitor.

FIG. 3B illustrates a use of an independent log monitor 320 to monitor the information flow between identifier database 308 and data request database 312. The log monitor compares the logs from identifier database 308 and data request database 312. Mismatches in the logs may result from an user's unauthorized queries to the data request database 312 to obtain information without being routed through the identifier database 308. Alternatively, this may also result from attempts to query the identifier database and link internal I.D. to identifying information. When such a discrepancy occurs, the log monitor 320 transmits a warning to the user 300 or to an independent verification system.

FIG. 3C illustrates a system including a single user 300 and multiple data request databases 350, 354. Multiple data request databases divide and thereby reduce the amount of information processed and controlled by each administrator of each data request database 350, 354. Partitioning the information improves security. In FIG. 3C, the user at the source terminal partitions and encrypts data for each of the data request database units 350, 354. The identifier database 358 verifies the identity of user 300 and forwards the partitioned and encrypted data to the respective first data request database 350 and/or second data request database 354. In one embodiment of the invention, each data request database 350, 354 has its own corresponding public-private encryption key-pairs to secure of transmission between user 300 and each of the data request databases 350, 354. Each data request database 350, 354 responds to the request and transmits its response directly back to user 300 which recombines the responses.

FIG. 3D illustrates dividing the identifier database to reduce the amount of information processed by each identifier database. In FIG. 3D, user 300 transmits an individual request to either or both first identifier database 362 and second identifier database 366. When either first identifier database 362 or second identifier database 366 confirms the identity of user 300 and the subject of the query, the identifier databases 362 and 366 forward the data access request to data request database 370. Data request database 370 provides user 300 with the response along data path 376. In one embodiment of the invention, dual identifier databases 362, 366 may be used to increase security by requiring additional verification of the authenticity of user 300 by independent verification of different identification criteria at each identifier database 362, 366. In the described embodiment, data request database 370 provides a response only when both identifiable databases 362, 366 verify a request. Alternately, multiple identifier databases may be used to assign different users or subjects to corresponding identifier databases as additional security mechanism or to load balance the flow of data through the entire network.

Figure 4:
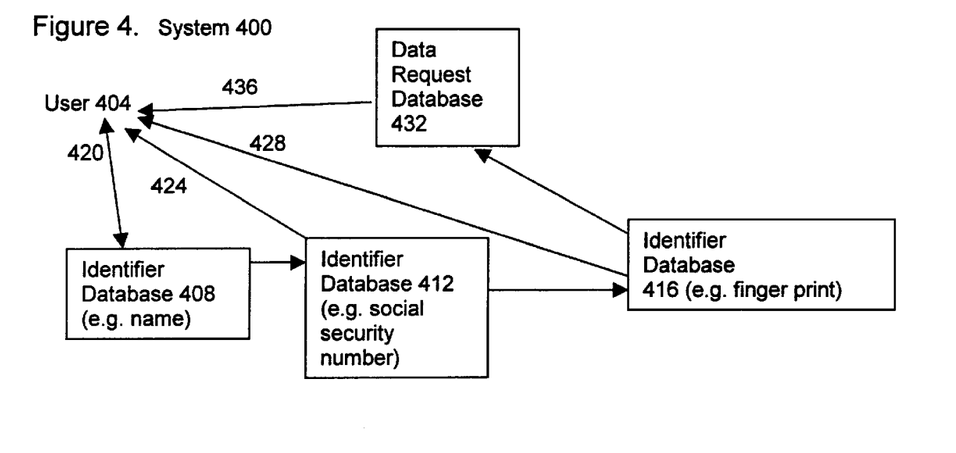
FIG. 4 illustrates the use of multiple identifier database in one embodiment of the invention.

In system 400 illustrated in FIG. 4, a user 404 transmits a data request with user and subject identifying information to a first identifier database 408 in a chain of identifier databases. Each identifier database 408, 412, 416 in the chain verifies a specific unit of user or subject identifying data. For example, first identifier database 408 may contain the name of the subject. When the first identifier database confirms the data, such as the name, the first identifier database 408 forwards the query to a second identifier database 412. Second identifier database 412 further verifies the identity of the subject by comparing a second unit of information such as a Social Security number of the subject to the received data. When the information is again verified, the second identifier database 412 communicates the request to a third identifier database 416 which may compare a third unit of data such as a fingerprint to verify the identity of the subject of the query.

Each identifier database keeps user 404 informed of the query progress through the various identifier databases using return data paths 420, 424, 428. Records belonging to the same subject (or user) are linked between identifier databases using an internal identification. For example, each identifier database in an identifier database pair such as identifier database pairs 412, 416 share a common internal identification. User 404 encrypts data for each identifier database 408, 412, 416 with a public key of that identifier database. When all three identifier databases 408, 412, 416 verify that the subject or user 404 is satisfactorily identified, data request database 432 receives the data access request and transmits the response to the user 404 along data path 436.

The function of an identifier database has been defined as verifying the identity of the user and subject and converting subject identifiers into an internal I.D. A data request database receives a data access request forwarded from an identifier database and provides a response. For each valid user-subject pair, each identifier database outputs at least one user or subject internal identification (I.D.), the internal I.D. being an index that links adjacent identifier databases or a link used to connect information between an identifier database and a data request database. Data request databases are defined to be the databases which output the result of the query, typically a complex data type which may include ASCII text, charts, and other embedded information. In one embodiment of the invention, the data request database is the last link in a chain which provides information directly to the user. However, it is possible for a database to function as both an identifier database and a data request database. Such an embodiment is illustrated in FIG. 5 in which a single administrator controls a combination second identifier database and a data request database.

Figure 5:
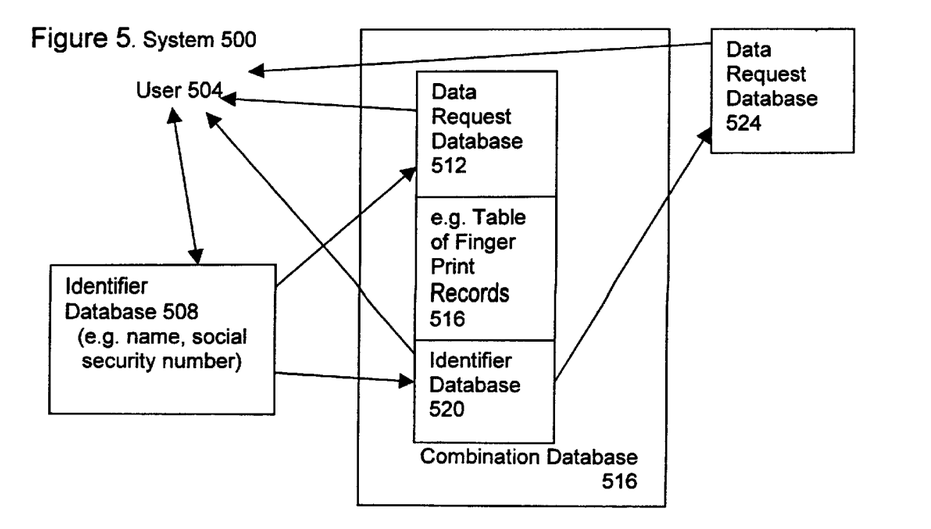
FIG. 5 illustrates a combination identifier and data request database under a common administrative control as implemented in one embodiment of the invention.

In the system 500 illustrated in FIG. 5, a user 504 transmits a query to a first identifier database 508. When identifier database 508 verifies that user 504 is authorized to receive the requested data, the identifier database 508 forwards the data access request to a data request database portion 512 of a combination database 516. The data request database 512 portion of combination database 516 provides a response to user 504.

Identification information in data request database 512 may serve as both identification information and/or data requested. For example, combination database 516 may have the task of maintaining fingerprint I.D. records. A data access request from identifier database 508 may contain instructions to add a new fingerprint record to the table of fingerprint records 516. At the successful completion of this operation, a message is sent back to user 504 from data request database 512. Alternatively, a fingerprint that identifies a user or subject may be sent from identifier database 508 to identifier database 520. After confirming the identity through matching with records in a table of fingerprint records 516, an internal I.D. is generated. When the data transfer is authorized, the identifier database 520 forwards the internal I.D. and the data access request to a second data request database 524 which provides the response back to user 504.

Various permutations of identifier databases and data request databases can be combined or altered to implement data management systems with various performance, data security, data integrity and confidentiality trade offs.

From the above description of drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or central characteristics. For example, although the description uses examples of one subject or patient, a number or entities or patients' records can be similarly accessed with one request. The limitations of the specific invention and its equivalent are defined by the claims which follow.

What is claimed is:

1. A method for managing data comprising:

transmitting a packet of data including an identifier encrypted in a first code and a data access request encrypted with a second code to a first system, the data access request requesting data corresponding to the identifier, the first system configured to decode and authenticate the identifier and to forward the data access request with an internal index to a second system.

2. The method of claim 1 wherein the first system is under a first administrative control and the second system is under a second administrative control.

3. The method of claim 1 further comprising:

encrypting the identifier using a public key of the first system; and encrypting the data access request using a public key of the second system.

4. The method of claim 3 where in the identifier is digitally signed enabling authentication of an originator of the packet of data.

5. The method of claim 1 wherein the identifier includes a subject representation.

6. The method of claim 1 wherein the first system updates a log indicating receipt of query or transmission of the packet of data and the second system updates a log indicating receipt of the data access request or transmission of results of the data access request.

7. An apparatus under control of a first administrator to process secure data comprising:

an input port to receive an identifier encrypted in a first code and a data access request encrypted in a second code from a source, the data access request requesting data corresponding to the identifier;

a processor to decrypt the first code and determine an internal identification corresponding to the identifier; and an output connection to output the internal identification and the data access request encrypted in the second code to a second apparatus including a second database operating under a second administrator.

8. The apparatus of claim 7 wherein the processor verifies that a user issuing the data access request has an appropriate access level.

9. The apparatus of claim 8 wherein the processor transmits the data access request to the second apparatus after a verification that the source has the appropriate access level.

10. The apparatus of claim 7 further comprising:

a memory to store a log, the log including records of internal identification codes transmitted to the second apparatus.

11. The apparatus of claim 7 wherein the first code is decoded using a private key.

12. A system to manage sensitive data comprising:

a source terminal to receive a data access request, and output a data packet, the data packet including a first subsection of identifier information coded in a first code and a second subsection of request data coded in a second code, the data access request requesting data corresponding to the identifier information;

an identifier database to receive the data packet and decode the identifier information, the identifier subnetwork retrieving an internal identifier based on the identifier information, and associating the internal identifier with the request data coded in the second code; and a data request database to receive the internal identifier and the request data coded in the second code, the data request database to decode the request data and return a response to the source terminal.

13. The system of claim 12 wherein the first code uses a public key of the identifier database and the second code uses a public key of the data request database.

14. The system of claim 12 wherein the identifier database and the data request database are each a part of a corresponding subnetwork.

15. A method of managing sensitive data comprising:

receiving an internal identifier associated with a coded data request from an identifier database, the coded data request requesting data corresponding to the internal identifier;

decoding the coded data request and performing the data request; and transmitting an output response to a source terminal.

* * * * *